Jan. 12, 1965 F. HENMUELLER 3,165,699
AUTOMATIC GAIN CONTROL SYSTEM FOR SUPPRESSED CARRIER SINGLE SIDEBAND RADIO RECEIVERS
Filed June 20, 1962
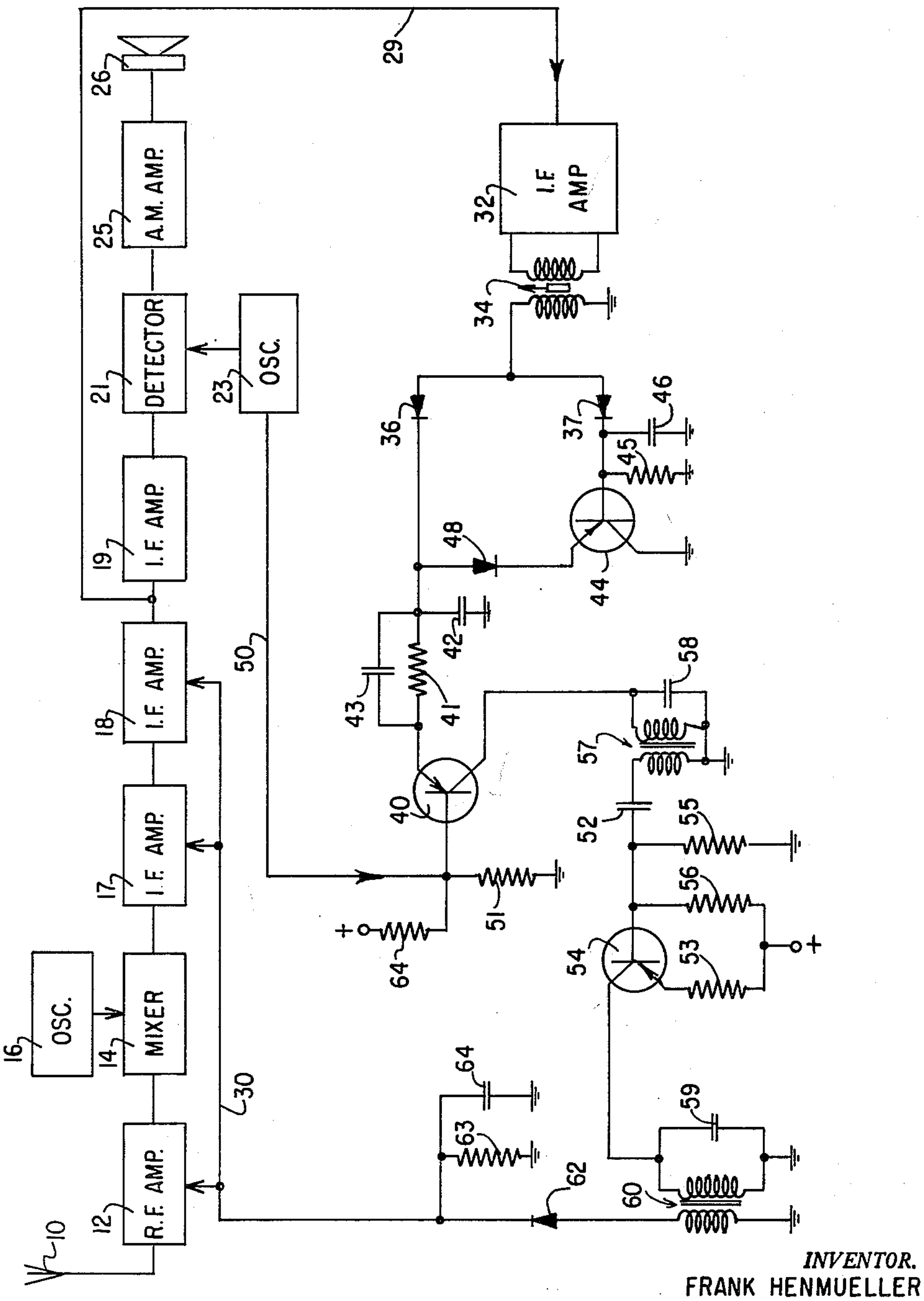
*INVENTOR.*
FRANK HENMUELLER
*BY*
ATTYS.

3,165,699

AUTOMATIC GAIN CONTROL SYSTEM FOR SUPPRESSED CARRIER SINGLE SIDEBAND RADIO RECEIVERS

Frank Henmueller, Chicago, Ill., assignor to Motorola, Inc., Chicago, Ill., a corporation of Illinois Filed June 20, 1962, Ser. No. 203,877
6 Claims. (Cl. 325—410)

This invention relates to signal amplifying systems and more particularly to an automatic gain control circuit especially useful in suppressed carrier single sideband radio receivers.

Although use of automatic gain control systems to keep the signal level of amplifiers in radio receivers constant as a function of received carrier wave signals is well known, suppressed carrier single sideband receiving systems present particular problems that make application of conventional AGC systems unsatisfactory. The modulated sideband signals that are present in suppressed carrier single sideband receivers, as for example those produced by spoken syllables of a voice message of words and sentences, are present as signal components that appear and disappear at random intervals. Accordingly, there will be time periods when no signal components are present during reception of the message, and the timing in terms of attack and decay times of the AGC system becomes an important consideration.

If the attack or time for initial response of the AGC circuit to the appearance of a signal is too fast, the AGC level may respond or be set by noise impulses, thereby causing the gain of the receiver to be controlled by this noise. In addition, if the attack time is too fast the receiver may produce an undesirable thumping noise when a received signal initially increases the AGC level. On the other hand, if the attack time is too slow the receiver may be overdriven, resulting in distortion prior to the time a sufficient AGC level can be developed. In considering the decay time, the AGC signal must persist between words and phrases of the received modulated signal to prevent an increase of receiver gain and increased background noise. Although a slow decay may be achieved by providing the AGC system with a long time constant integrator network, time constants sufficient to overcome initial decay must be made so long in this case as to prevent proper recovery of the receiver at the end of the reception period. This may result in loss of the initial portion of a second message received from an additional transmitter which closely follows the first message.

The most desirable type of AGC circuit for suppressed carrier single sideband receivers is one which provides a step type control signal which remains at a given level for a predetermined period and then rapidly decreases to zero or to a reference level. If the amplitude of the single sideband signal increases while the AGC signal level is at any given step level, the step increases to a new level. If, however, received signal components decrease, the AGC level remains relatively constant for a predetermined period so that the gain of the system does not fluctuate between words and phrases of a voiced message. A circuit producing step AGC control functioning in this manner is disclosed by Orville M. Eness in application Serial No. 53,949, filed September 6, 1960, and commonly assigned. The circuit of the present invention uses a step control voltage in the AGC system of a suppressed carrier single sideband receiver to maintain constant output signals over a wide range of input signals while at the same time allowing rapid amplifier gain recovery. The circuit further includes means for applying step AGC in the form of feedback to the amplifier stages in the receiver in the manner which eliminates the need of a D.C. amplifier in the AGC system, thereby providing an AGC system which is more stable than previously known step AGC systems.

It is therefore an object of this invention to meet the above described requirements to provide a practical AGC system which can properly follow the sideband information of a suppressed carrier signal.

Another object is to provide an AGC system which allows rapid receiver recovery so that both strong and weak signals may be received, yet has sufficient delay before recovery to prevent noise bursts from appearing in the receiver during nulls in the sideband signal while weak signals are being received.

Another object is to provide an improved transistorized step AGC control for single sideband receivers which uses a switching transistor to control the time constant of the AGC signal and means to apply step control AGC to amplifier stages of the receiver in a manner eliminating the need of D.C. amplifiers in the AGC loop.

A feature of the present invention is the provision of an AGC system having an integrator with a long decay time constant for establishing the level of the AGC signal and a transistor means controlled by an integrator with a short decay time constant to discharge the long decay time constant integrator after a predetermined interval in the absence of signal components.

Another feature is the provision of semiconductor switching means responsive to a predetermined voltage difference between integrating circuits having different decay time constants to allow the established level of an AGC circuit to remain high for a predetermined time after decrease in the level of single sideband signal components to prevent an increase in receiver gain and background noise during nulls in the signal while at the same time allowing proper recovery of the system for subsequently received signals.

A further feature is the provision of a step AGC system for suppressed carrier signal sideband receivers having an AGC signal controlled by a switching circuit responsive to the voltage difference between two signal integrating circuits to allow rapid attack of the system and slow decay for a predetermined time, after which time the receiver is able to respond to weak signals.

Another feature is the provision of circuit means to amplify and detect a constant level continuous wave signal to be applied as a gain control signal in a suppressed carrier single sideband receiver. The amplifying means is controlled by a step AGC control voltage derived from the IF stages of the receiver so that proper receiver response and sufficient delay to inhibit noise pulses occurring between peaks of the sideband signals are achieved, while use of a detected continuous wave for the receiver gain control signal eliminates the need of D.C. amplifiers in the AGC loop.

The accompanying drawing is a diagram partly in block, partly schematic showing a radio receiver incorporating the invention.

In a particular form the AGC control system of the invention provides a step-type control which remains at a given level for a predetermined period of time and then decreases to a reference or zero signal level. The system includes a detector circuit having a relatively short attack time and an extremely long decay time for providing a direct current AGC control voltage. The system further includes a second detector circuit having a short decay time to provide a direct current voltage for controlling a semiconductor switching circuit. When the voltage between the two detector circuits differ by a predetermined amount, the switching circuit is rendered conductive to cause rapid discharge of the long decay time circuit to reduce the AGC control voltage level to a reference or zero value. Thus, at the cessation of received signal components the established AGC control voltage remains relatively constant for a period of time determined by the short decay time constant circuit, after which time the AGC control voltage is reduced to a low level to allow maximum receiver gain for reception of subsequent messages. The time period during which the AGC control voltage is held at its former level is sufficiently long to prevent noise impulses from appearing in the receiver during nulls in the sideband signals as occur, for example, between words or syllables of a voice message used to moderate the signal.

The AGC control voltage provided in the above manner is used to control the gain of a transistor amplifier. A fixed amplitude RF signal, obtained from the reinsertion oscillator of the receiver, is amplified by this amplifier and subsequently rectified to provide a D.C. voltage. This rectified voltage is proportional to the system signal level because of the manner in which the transistor amplifier gain is controlled, and is applied as feedback to control the gain of amplifier stages in the receiver system in the usual manner to provide the desired AGC action.

The drawing shows a receiver for suppressed carrier single sideband signals and the transistorized automatic gain control system for the receiver. Antenna 10 is connected to radio frequency amplifier 12, from which the amplified and selected signals are applied to mixer stage 14. Signals from local oscillator 16 are also applied to mixer stage 14 to provide an intermediate frequency signal which is successively applied to intermediate frequency amplifier stages 17, 18 and 19. Signals from IF amplifier 19 are demodulated in detector 21. Oscillator 23 is also connected to detector 21 to provide a signal for reinserting the suppressed carrier for proper operation of the detector circuit. It will be understood by those skilled in the art that various specific forms of a suitable detector circuit may be used depending upon considerations in the overall communications systems of this type. One desirable characteristic of detector 21 would be that it provides peak limiting of the signal during the initial portion of any signal component to prevent overdrive and distortion during the time that the automatic gain control system is becoming effective. It is to be also understood that oscillator 23 may be of various types, properly phase locked with the incoming signal, to provide reinsertion of the carrier for the operation of detector 21 in a manner conventional for the reception of suppressed carrier single sideband signals. The demodulated audio signal from detector 21 is supplied to suitable audio frequency amplifier 25 and to loudspeaker 26, or to other means for the desired utilization of the received signal.

In accordance with known practice in two-way communication receivers of the general type under consideration, an automatic gain control potential is applied on lead 30 to RF amplifier 12 and IF amplifiers 17 and 18. This signal is in the nature of a feedback signal to control the gain of these receiver stages in a manner inversely related to the received signal strength in order to maintain a more nearly constant output from the receiver despite variations in received signal strength. Generally this gain control is achieved by regulating the bias of the amplifier tubes or transistors in the receiver stages.

The output of the second IF amplifier 18 is also connected by lead 29 to a further IF amplifier 32, the output of which appears across primary winding of tuned transformer 34. One terminal of the secondary winding of transformer 34 is connected to a reference point or ground and the other terminal thereof is coupled to the anode electrode of each of diodes 36 and 37. Amplifier 32 preferably includes an impedance matching stage such as an emitter follower, or alternately transformer 34 may have a high turns ratio, so that the IF signal is coupled to each of diodes 36 and 37 from a low impedance source for the reasons hereinafter mentioned.

The cathode electrode of diode 36 is coupled to ground through capacitor 42 and is further connected to the emitter electrode of transistor 40 by resistor 41. Capacitor 43 bypasses resistor 41 to couple the emitter of transistor 40 to A.C. ground. Resistor 41 and capacitor 42 form a long time constant integrator circuit for the output of detector 36. The cathode electrode of diode 37 is connected to the base electrode of transistor 44. The common point between the cathode of diode 37 and the base of transistor 44 is also connected to ground by the parallel combination of resistor 45 and capacitor 46. Capacitor 46 and resistor 45 are of values selected to form a short time constant integrator network with respect to the time constant presented by capacitor 42 and resistor 41. A threshold diode 48 is connected between the cathode of diode 36 and the emitter electrode of transistor 44. Diode 48 is poled to conduct from the cathode of diode 36, through the emitter to collector junction of transistor 44, to ground reference potential when the charge on capacitors 42 and 46, respectively, differ by a predetermined amount. A silicon diode is shown in the drawing, although a Zener or other breakdown diode, connected with appropriate polarity, may also be used.

Transistor 40 functions as an RF amplifier and receives a constant amplitude continuous wave signal as developed across resistor 51 to its input base electrode. Typically this signal may be derived on lead 50 from oscillator 23. It is to be understood, however, that the source and exact frequency of this signal is not critical, it only being necessary that the signal be of relatively high frequency and have a constant CW amplitude. Direct current operating voltage is applied to transistor 40 through resistor 64. The RF output appearing at the collector electrode of transistor 40 is coupled to the input winding of coupling transformer 57. A tuned circuit including the input winding of transformer 57 and capacitor 58 is connected between the collector electrode of transistor 40 and ground reference potential. This circuit is selected to tune the RF signal translated by transistor 40 to a given frequency as, for example, the frequency of the signal produced by oscillator 23. Capacitor 52 couples the output winding of transformer 57 to the input base electrode of transistor 54. Resistor 55 further ties the base electrode of transistor 54 to ground reference potential. Biasing voltages for transistor 54 are supplied to the emitter and base electrodes through stabilizing resistors 53 and 56 respectively. The output collector electrode of transistor 54 is tuned in the same manner as the collector electrode of transistor 40 by a tuned circuit including capacitor 59 and the primary winding of coupling transformer 60. The secondary winding of transformer 60 couples the output RF signal developed across the tuned circuit in the collector circuit of transistor 54 to the anode electrode of diode 62. A filter circuit including resistor 63 and capacitor 64 connects the cathode electrode of diode 62 to ground reference potential. Therefore, diode 62 acts as a rectifier to provide a direct current output voltage on lead 30 which is proportional to the amplitude of the continuous wave RF signal translated by transistor amplifiers 40 and 54. Control of the gain of transistor 40 in the manner hereinafter described by a stepped DC voltage proportional to the magnitude of the receiver IF signal as derived from transformer 34 provides automatic gain control for the receiver system.

The output of IF amplifier 32 appearing in the secondary of transformer 34 is detected by diode 36 to charge capacitor 42 to a value proportional to the receiver signal level. This voltage is in turn connected through resistor 41 to the emitter electrode to control the gain of RF transistor 40. The output IF signal in the secondary of transformer 34 is also detected by diode 37 to charge capacitor 46 to the same approximate DC voltage level as capacitor 42. This voltage is further connected to the base electrode of transistor 44 to retain that transistor in a cutoff condition. When transistor 44 is non-conducting the cathode of diode 48 is maintained at the voltage level developed across capacitor 46. The charging time constant for capacitor 42 and hence the attack time for the AGC system is determined by the capacitance value of capacitor 42, by the impedance of diode 36 and by the source impedance presented by the secondary winding of transformer 34. By proper selection of the value of capacitor 42 and by matching transformer 34 with IF amplifier 32 so that its secondary represents a low source impedance, the desired fast attack times of the system can be obtained. The discharge time constant for the integrator circuit including resistor 41 and capacitor 42 is determined by the relative values of capacitor 42, resistor 41 and the impedance presented by the emitter to collector DC return path of transistor 40. By selecting resistor 41 to be of a high value this time constant can be made extremely long.

Assuming that the charge across capacitors 42 and 46 has stabilized to the same approximate value, transistor 44 remains cutoff and the gain of RF amplifier 40 is controlled by this value to provide an RF signal of proportionate amplitude which is rectified by diode 62 and applied to gain control lead 30. Any increase in the signal level provided by IF amplifier 32 results in an increase in the amplified RF signal and hence an increase in the control voltage on lead 30 to provide the desired AGC action. However, if there is a decrease in signal level provided by IF amplifier 32, the long time constant discharge path provided for capacitor 42 tends to retain the emitter voltage for transistor 40 and hence the gain control voltage on lead 30 at its previous higher level. At the same time capacitor 46 discharges at a much more rapid rate through resistor 45. Thus, if the output of IF amplifier 32 is reduced to a no-signal condition the voltage across capacitors 42 and 46, respectively, will change at different rates. When the difference between these two voltages has reached a predetermined value diode 48 and transistor 44 are rendered conductive. There is provided therefore a low impedance discharge path for capacitor 42 through diode 48 and through the emitter to collector junction of transistor 44 to ground. This switching action is determined by the characteristics of diode 48 and the biasing of transistor 44 and allows rapid discharge of capacitor 42 to provide a no-signal bias voltage to the emitter electrode of transistor 40. This in turn provide a no-signal AGC reference potential on lead 30 at the end of a predetermined delay.

It should be noted that the switching action of transistor 44 does not occur until after a predetermined delay after the output of IF amplifier 32 is reduced. This delay period is determined by the discharge time constant of capacitor 46 through resistor 45 and a no-signal AGC condition is not reached until the breakdown voltage of diode 48 has been exceeded. This delay period can be conveniently selected to be greater than the time period of voids appearing between words and syllables in the sideband voice modulated signal to prevent objectionable noise impulses from appearing in the receiver during reception of a message. On the other hand, after the predetermined delay period the receiver is rapidly returned to a no-signal AGC reference level. This allows rapid recovery of the receiver for reception of subsequent messages which may be very weak in nature compared to the previous message which has set the AGC system.

It should be further noted that transistor 44 performs a switching function and does not amplify the AGC signal ultimately appearing on lead 30. The direct current voltage derived from the IF signal channel in the receiver merely controls the gain of transistor 40, which in itself is an RF amplifier, so that no DC amplification of the gain control signal is needed. The output RF signal of transistor 40 is further amplified to a desired level by transistor 54 and then detected to be distributed to various receiver stages on AGC lead 30. This eliminates the necessity of utilizing DC amplifiers in the gain control loop, which amplifiers are extremely voltage and temperature sensitive so that their use necessitates additional complex stabilizing circuitry.

In a system of practical construction operative as previously described, representative circuit component values were as follows:

| | |
|---|---|
| Diodes 36, 37, 38 and 62 | 1N461. |
| Transistors 40, 54 | 2N1897. |
| Transistor 44 | 2N652. |
| Resistor 41 | 1,000,000 ohms. |
| Capacitor 42 | 40 microfarads. |
| Capacitors 43, 52, 64 | .01 microfarad. |
| Resistor 45 | 33,000 ohms. |
| Capacitor 46 | 10 microfarads. |
| Resistor 51 | 1,200 ohms. |
| Resistor 55 | 10,000 ohms. |
| Resistor 56 | 2,200 ohms. |
| Resistor 53 | 3,900 ohms. |
| Resistor 63 | 4,700 ohms. |

It may be seen that the AGC system of the invention provides a fast attack or response as a received signal increases in amplitude and that it includes a delay in decrease of the gain control level when the received signal is decreased in amplitude. The system is particularly useful in a suppressed carrier single sideband receiver in order to provide automatic gain control in the absence of a fixed carrier. The present gain control system will respond rapidly to signal level increases and will maintain a desired gain level for a time sufficient to insure receiver operation without undue noise appearing in signal gaps while at the same time will still maintain a high degree of intelligibility of all signals received by a particular receiver which is gained control. The actual gain control potential applied to various stages in the receiver is obtained from a rectified RF signal created locally in the receiver while a step control voltage controls the gain of an amplifier translating this RF signal. Therefore, voltage and temperature sensitive D.C. amplifiers are not needed in the AGC loop so that stable and reliable operation may be achieved without utilizing complex compensating circuitry.

I claim:

1. In a single sideband receiver, said receiver having a plurality of stages for translating a received wave signal and also having a source of continuous wave signals for restoring the carrier to said received wave signal, an automatic gain control system including in combination, first circuit means including a rectifier circuit for applying a unidirectional gain control voltage to the signal translating stages of said receiver, second circuit means including an alternating current amplifying device coupled between said continuous wave signal source and said first circuit means, a first detector circuit including a long time constant decay network for supplying a voltage indicative of the level of the signal translated by said receiver to control the gain of said alternating current amplifying device, switching means operable between a conductive and a non-conductive state coupled between said long time constant decay network and a reference potential, and a second detector circuit including a short time constant decay network for providing a voltage indicative of the level of the signal translated by said receiver to control the conductive state of said switching means thereby to discharge said long time constant decay network subsequent to the reduction of the level of the signal translated by said receiver.

2. In a receiver for wave signals having a suppressed carrier, said receiver having a plurality of stages for translating a received wave signal and also having a source for a continuous wave signal for restoring the carrier to said received wave signal, an automatic gain control system including in combination, circuit means including a rectifier circuit having an input and an output for applying a unidirectional gain control voltage to the signal translating stages of said receiver, amplifier means for said continuous wave signal having an input coupled to said continuous wave signal source and an output coupled to the input of said rectifier circuit, said amplifier means further having a gain control terminal, first detector means coupled with a signal translating stage of said receiver and including a long time constant decay network for supplying a unidirectional voltage indicative of the level of the signal translated by said receiver to the gain control terminal of said amplifier means, switching means having a control terminal and operable between first and second conductive states coupled between said long time constant decay network and a reference potential, said second detector means coupled with a signal translating stage of said receiver and including a short time constant decay network for applying a unidirectional voltage indicative of the level of the signal translated by said receiver to control the conductive state of said switching means, such that said switching means is maintained in a non-conducting state when both said decay networks are charged to the same voltage and is switched to a conducting state when said short time constant decay network discharges a predetermined amount below the voltage of said long time constant decay network, thereby to discharge said long time constant decay network subsequent to the reduction of the level of the signal translated by said receiver.

3. A signal translating system having a gain level therein dependent upon the level and duration of a translated signal, including in combination, a gain establishing circuit connected to said signal translating system for establishing the gain thereof in response to a control signal, a source of constant amplitude unmodulated high frequency signals in said receiver, circuit means including an amplifying device coupled to said high frequency signal source for supplying a control signal to said gain establishing circuit, a first detector circuit for providing a voltage indicative of the level of a translated signal in said system, said first detector circuit including a long time constant decay network connected to a control electrode of said amplifying device, with said control signal responsive to the voltage provided by said first detector circuit, a second detector circuit including a short time constant decay network for providing a voltage indicative of the level of said translated signal, and switching circuit means including a transistor connecting said long time constant decay network to a reference potential, with said short time constant decay network connected to a control electrode of said transistor, so that said transistor is maintained in a non-conducting state when both said decay networks are charged to the same voltage and is switched to a conducting state when said short time constant decay network discharges a predetermined amount below the voltage of said long time constant decay network, whereby the gain control signal remains at an established level for a fixed interval in the absence of a translated signal and is returned to a reference level at the end of said interval.

4. A signal translating system having a gain control level therein dependent upon the level and duration of a translated signal, including in combination, a transistor having an input electrode coupled to a constant amplitude continuous wave signal source in said signal translating system, said transistor further having an output electrode and a control electrode for controlling the amplitude of the continuous wave signal derived from said source, circuit means coupled to said output electrode to provide a unidirectional gain control signal for said system in response to the amplitude of the continuous wave signal, circuit means for applying said unidirectional gain control signal to the signal translating stages of said system, a first detector circuit for providing a voltage indicative of the level of the translated signal in said system, said first detector circuit including a long time constant decay network, a second detector circuit for providing a voltage indicative of the level of the translated signal in said system, said second detector circuit including a short time constant decay network, switching circuit means connecting said long time constant decay network to a reference potential, means coupling said short time constant decay network to said switching means to discharge said long time constant decay network when the voltage difference between the two said decay networks exceeds a predetermined value, and means connecting said long time constant decay network to the control electrode of said transistor to control the amplitude of the continuous wave signal appearing at said output electrode in response to the voltage provided by said long time constant decay network, whereby an established gain control signal level is maintained for a predetermined period after cessation of the translated signal in said system.

5. In means for translating a suppressed carrier signal, which means includes stages for translating a received wave signal and a continuous wave signal source for restoring the carrier to said received wave signal, an automatic gain control system including in combination, a first transistor having an input electrode coupled to said continuous wave signal source, said first transistor further having an output electrode and a control electrode for controlling the amplitude of the continuous wave signal derived from said source, circuit means coupled to said output electrode to provide a unidirectional gain control signal for signal translating stages of said system in response to the amplitude of the continuous wave signal, a first integrating network having a long time constant discharge path, a first detector circuit for providing a direct current voltage indicative of the level of a translated signal across said first integrating network, a second integrating network having a short time constant discharge path, a second detector circuit for providing a direct current voltage indicative of the level of a translated signal across said second integrating network, circuit means including a semiconductor diode and a second transistor having a control electrode connecting said first integrating network to a reference potential, means coupling said second integrating network to the control electrode of said second transistor to discharge said first integrating network to said reference potential when the voltages across the two integrating networks differ by a fixed amount, and means connecting said first integrating network to the control electrode of said first transistor to control the amplitude of the continuous wave signal appearing at said output electrode in response to the voltage across said first integrating network, whereby an established gain control signal is maintained for a delay period after reduction in level of said translated signal.

6. A signal translating system having a gain level therein dependent upon the level and duration of a translating signal, including in combination, a gain establishing circuit connected to said signal translating system for establishing the gain thereof in response to a unidirectional control voltage, a source of constant amplitude unmodulated high frequency signals in said system, circuit means including an alternating current amplifying device coupled to said high frequency signal source for supplying a unidirectional control voltage to said gain establishing circuit, a first detector circuit for providing a voltage indicative of the level of a translated signal in said system, said first detector circuit including a long time constant voltage discharge circuit connected to a control electrode of said alternating current amplifying device, with said unidirectional control voltage responsive to the voltage provided by said first detector circuit, a second detector circuit including a short time constant voltage discharge circuit for providing a voltage indicative of the level of said translated signal, transistor means having base, emitter, and collector electrodes, with said collector electrode connected to a reference potential, a threshold diode connected between said emitter electrode and said long time constant voltage discharge circuit, and means connecting said base electrode to said short time constant voltage discharge circuit, so that said transistor is maintained in a non-conducting state when the voltages across said two discharge circuits are substantially equal and is switched to a conducting state when the voltages across said two discharge circuits differ by an amount that exceeds the breakdown voltage of said threshold diode, whereby the gain control voltage remains at an established level for a fixed interval in the absence of a translated signal and is returned to a reference level at the end of said interval.

References Cited in the file of this patent

UNITED STATES PATENTS

| | | |
|---|---|---|
| 2,957,074 | Trevor | Oct. 18, 1960 |
| 3,060,329 | Harrison et al. | Oct. 23, 1962 |

FOREIGN PATENTS

| | | |
|---|---|---|
| 807,780 | Great Britain | Jan. 21, 1959 |

OTHER REFERENCES

Goodman: "Better A.V.C. for S.S.B. and Code Reception," in QST, January 1957, pp. 16, 17.